United States Patent
Bendahan et al.

(10) Patent No.: US 9,557,427 B2
(45) Date of Patent: Jan. 31, 2017

(54) THIN GAP CHAMBER NEUTRON DETECTORS

(71) Applicant: Rapiscan Systems, Inc., Torrance, CA (US)

(72) Inventors: Joseph Bendahan, San Jose, CA (US); Michael King, Mountain View, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 14/591,983

(22) Filed: Jan. 8, 2015

(65) Prior Publication Data

US 2016/0018538 A1    Jan. 21, 2016

Related U.S. Application Data

(60) Provisional application No. 61/925,025, filed on Jan. 8, 2014.

(51) Int. Cl.
*G01T 3/08* (2006.01)
*G01T 3/00* (2006.01)

(52) U.S. Cl.
CPC .................................... *G01T 3/008* (2013.01)

(58) Field of Classification Search
CPC ..................................................... G01T 3/08
(Continued)

(56) References Cited

U.S. PATENT DOCUMENTS 2,299,251 A    10/1942  Perbal
2,831,123 A     4/1958  Daly
(Continued)

FOREIGN PATENT DOCUMENTS

CA    2624658 A1    9/2009
CA    2624663 A1    9/2009
(Continued)

OTHER PUBLICATIONS

United States Nuclear Regulatory Commission, "Neutron Detections", Oct. 13, 2010, http://www.nrc.gov/docs/ML1122/ML11229A713.pdf, accessed May 15, 2016.*
(Continued)

*Primary Examiner* — David Porta
*Assistant Examiner* — Abra Fein
(74) *Attorney, Agent, or Firm* — Novel IP

(57) ABSTRACT

The present specification describes systems and methods for the simultaneous detection of radioactive materials such as neutrons, muons and gamma rays based on thin gap chamber technology. A thin-gap chamber (TGC) is disclosed having a thermal neutron absorber material, such as $^{10}B_4C$ or $^{10}B_8C$, which interacts with neutrons to emit heavy particles. The heavy particles, in turn, interact with the gas present in chamber to produce ionization that is converted into a measurable signal. The TGC is embedded in a neutron moderating medium. The detector systems are fabricated from commercially available construction materials and are easy to manufacture at a reasonable cost when compared to conventional He-3 neutron detector systems.

6 Claims, 7 Drawing Sheets

(58) Field of Classification Search
USPC .................................. 250/367, 368, 390.01
See application file for complete search history.

(56) References Cited

U.S. PATENT DOCUMENTS

| | | | |
|---|---|---|---|
| 2,971,433 A | 2/1961 | Akin |
| 3,140,397 A | 7/1964 | Henry |
| 3,374,355 A | 3/1968 | Parratt |
| 3,603,793 A | 9/1971 | Warren |
| 3,676,783 A | 7/1972 | Kinbara |
| 3,707,672 A | 12/1972 | Miller |
| 3,713,156 A | 1/1973 | Pothier |
| 3,766,387 A | 10/1973 | Heffan |
| 3,767,850 A | 10/1973 | McMillian et al. |
| 3,770,955 A | 11/1973 | Tomita |
| 3,784,837 A | 1/1974 | Holmstrom |
| 3,898,463 A | 8/1975 | Noakes |
| 3,904,923 A | 9/1975 | Schwartz |
| 3,914,614 A | 10/1975 | Martone |
| 4,020,346 A | 4/1977 | Dennis |
| 4,047,035 A | 9/1977 | Dennhoven |
| 4,122,783 A | 10/1978 | Pretini |
| 4,139,771 A | 2/1979 | Dennhoven |
| 4,210,811 A | 7/1980 | Dennhoven |
| 4,216,499 A | 8/1980 | Dennhoven |
| 4,254,599 A | 3/1981 | Maistre |
| 4,320,380 A | 3/1982 | Berard |
| 4,366,382 A | 12/1982 | Kotowski |
| 4,399,403 A | 8/1983 | Strandberg |
| 4,430,568 A | 2/1984 | Yoshida |
| 4,471,343 A | 9/1984 | Lemelson |
| 4,497,768 A | 2/1985 | Caldwell |
| 4,563,707 A | 1/1986 | Kishida |
| 4,566,113 A | 1/1986 | Doenges |
| 4,599,740 A | 7/1986 | Cable |
| 4,626,688 A | 12/1986 | Barnes |
| 4,634,568 A | 1/1987 | Wimpee |
| 4,641,330 A | 2/1987 | Herwig |
| 4,667,107 A | 5/1987 | Wang |
| 4,709,382 A | 11/1987 | Sones |
| 4,719,153 A | 1/1988 | Akasawa |
| 4,736,401 A | 4/1988 | Donges |
| 4,745,631 A | 5/1988 | Paolini |
| 4,754,469 A | 6/1988 | Harding |
| 4,788,704 A | 11/1988 | Donges |
| 4,789,930 A | 12/1988 | Sones |
| 4,817,123 A | 3/1989 | Sones |
| 4,825,454 A | 4/1989 | Annis |
| 4,853,595 A | 8/1989 | Alfano |
| 4,872,188 A | 10/1989 | Lauro |
| 4,884,289 A | 11/1989 | Glockmann |
| 4,897,550 A | 1/1990 | Bernard |
| 4,956,856 A | 9/1990 | Harding |
| 4,975,917 A | 12/1990 | Villa |
| 4,975,968 A | 12/1990 | Yukl |
| 4,979,202 A | 12/1990 | Siczek |
| 4,991,189 A | 2/1991 | Boomgaarden |
| 5,006,299 A | 4/1991 | Gozani |
| 5,007,072 A | 4/1991 | Jenkins |
| 5,008,911 A | 4/1991 | Harding |
| 5,014,293 A | 5/1991 | Boyd |
| 5,022,062 A | 6/1991 | Annis |
| 5,038,370 A | 8/1991 | Harding |
| 5,046,846 A | 9/1991 | Ray |
| 5,065,418 A | 11/1991 | Bermbach |
| 5,076,993 A | 12/1991 | Sawa |
| 5,078,952 A | 1/1992 | Gozani |
| 5,081,456 A | 1/1992 | Michiguchi |
| 5,091,924 A | 2/1992 | Bermbach |
| 5,098,640 A | 3/1992 | Gozani |
| 5,114,662 A | 5/1992 | Gozani |
| 5,153,439 A | 10/1992 | Gozani |
| 5,162,096 A | 11/1992 | Gozani |
| 5,179,581 A | 1/1993 | Annis |
| 5,181,234 A | 1/1993 | Smith |
| 5,182,764 A | 1/1993 | Peschmann |
| 5,185,778 A | 2/1993 | Magram |
| 5,202,932 A | 4/1993 | Cambier |
| 5,221,843 A | 6/1993 | Alvarez |
| 5,224,144 A | 6/1993 | Annis |
| 5,227,800 A | 7/1993 | Huguenin |
| 5,237,598 A | 8/1993 | Albert |
| 5,247,561 A | 9/1993 | Kotowski |
| 5,253,283 A | 10/1993 | Annis |
| 5,263,075 A | 11/1993 | McGann |
| 5,265,144 A | 11/1993 | Harding |
| 5,313,511 A | 5/1994 | Annis |
| 5,339,080 A | 8/1994 | Steinway |
| 5,345,240 A | 9/1994 | Frazier |
| 5,367,552 A | 11/1994 | Peschmann |
| 5,379,334 A | 1/1995 | Zimmer |
| 5,388,128 A | 2/1995 | Gozani |
| 5,420,905 A | 5/1995 | Bertozzi |
| 5,428,657 A | 6/1995 | Papanicolopoulos |
| 5,493,596 A | 2/1996 | Annis |
| 5,524,133 A | 6/1996 | Neale |
| 5,548,123 A | 8/1996 | Perez-Mendez |
| 5,548,630 A | 8/1996 | Hell |
| 5,552,705 A | 9/1996 | Keller |
| 5,557,283 A | 9/1996 | Sheen |
| 5,600,303 A | 2/1997 | Husseiny |
| 5,600,700 A | 2/1997 | Krug |
| 5,602,894 A | 2/1997 | Bardash |
| 5,606,167 A | 2/1997 | Miller |
| 5,608,214 A | 3/1997 | Baron |
| 5,638,420 A | 6/1997 | Armistead |
| 5,642,393 A | 6/1997 | Krug |
| 5,642,394 A | 6/1997 | Rothschild |
| 5,666,393 A | 9/1997 | Annis |
| 5,687,210 A | 11/1997 | Maitrejean |
| 5,689,239 A | 11/1997 | Turner |
| 5,692,028 A | 11/1997 | Geus |
| 5,696,806 A | 12/1997 | Grodzins |
| 5,744,919 A | 4/1998 | Mishin |
| 5,745,543 A | 4/1998 | De |
| 5,751,837 A | 5/1998 | Watanabe |
| 5,757,472 A | 5/1998 | Wangler |
| 5,763,903 A | 6/1998 | Mandai |
| 5,764,683 A | 6/1998 | Swift |
| 5,768,334 A | 6/1998 | Maitrejean |
| 5,787,145 A | 7/1998 | Geus |
| 5,805,660 A | 9/1998 | Perion |
| 5,838,758 A | 11/1998 | Krug |
| 5,838,759 A | 11/1998 | Armistead |
| 5,854,531 A | 12/1998 | Young |
| 5,903,623 A | 5/1999 | Swift |
| 5,910,973 A | 6/1999 | Grodzins |
| 5,930,326 A | 7/1999 | Rothschild |
| 5,940,468 A | 8/1999 | Huang |
| 5,974,111 A | 10/1999 | Krug |
| 6,011,266 A | 1/2000 | Bell |
| 6,026,135 A | 2/2000 | McFee |
| 6,031,890 A | 2/2000 | Bermbach |
| 6,054,712 A | 4/2000 | Komardin |
| 6,058,158 A | 5/2000 | Eiler |
| 6,067,344 A | 5/2000 | Grodzins |
| 6,069,936 A | 5/2000 | Bjorkholm |
| 6,081,580 A | 6/2000 | Grodzins |
| 6,094,472 A | 7/2000 | Smith |
| 6,115,128 A | 9/2000 | Vann |
| 6,118,850 A | 9/2000 | Mayo |
| 6,125,165 A | 9/2000 | Warburton |
| 6,128,365 A | 10/2000 | Bechwati |
| 6,151,381 A | 11/2000 | Grodzins |
| 6,184,841 B1 | 2/2001 | Shober |
| 6,188,743 B1 | 2/2001 | Tybinkowski |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,216,540 B1 | 4/2001 | Nelson |
| 6,218,943 B1 | 4/2001 | Ellenbogen |
| 6,249,567 B1 | 6/2001 | Rothschild |

(56) References Cited

U.S. PATENT DOCUMENTS

| | | |
|---|---|---|
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,288,676 B1 | 9/2001 | Maloney |
| 6,292,533 B1 | 9/2001 | Swift |
| 6,301,326 B2 | 10/2001 | Bjorkholm |
| 6,320,933 B1 | 11/2001 | Grodzins |
| 6,342,696 B1 | 1/2002 | Chadwick |
| 6,347,132 B1 | 2/2002 | Annis |
| 6,356,620 B1 | 3/2002 | Rothschild |
| 6,359,582 B1 | 3/2002 | MacAleese |
| 6,359,597 B2 | 3/2002 | Haj-Yousef |
| 6,373,066 B1 | 4/2002 | Penn |
| 6,417,797 B1 | 7/2002 | Cousins |
| 6,418,194 B1 | 7/2002 | McPherson |
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,448,564 B1 | 9/2002 | Johnson |
| 6,453,003 B1 | 9/2002 | Springer |
| 6,453,007 B2 | 9/2002 | Adams |
| 6,456,093 B1 | 9/2002 | Merkel |
| 6,456,684 B1 | 9/2002 | Mun |
| 6,459,761 B1 | 10/2002 | Grodzins |
| 6,459,764 B1 | 10/2002 | Chalmers |
| 6,469,624 B1 | 10/2002 | Whan |
| 6,473,487 B1 | 10/2002 | Le |
| RE37,899 E | 11/2002 | Grodzins |
| 6,480,141 B1 | 11/2002 | Toth |
| 6,483,894 B2 | 11/2002 | Hartick |
| 6,501,414 B2 | 12/2002 | Arndt |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,546,072 B1 | 4/2003 | Chalmers |
| 6,552,346 B2 | 4/2003 | Verbinski |
| 6,556,653 B2 | 4/2003 | Hussein |
| 6,563,903 B2 | 5/2003 | Kang |
| 6,567,496 B1 | 5/2003 | Sychev |
| 6,580,079 B1 | 6/2003 | Craig |
| 6,580,778 B2 | 6/2003 | Meder |
| 6,584,170 B2 | 6/2003 | Aust |
| 6,597,760 B2 | 7/2003 | Beneke |
| 6,605,473 B1 | 8/2003 | Hajduk |
| 6,606,516 B2 | 8/2003 | Levine |
| 6,621,888 B2 | 9/2003 | Grodzins |
| 6,628,745 B1 | 9/2003 | Annis |
| 6,636,581 B2 | 10/2003 | Sorenson |
| 6,650,276 B2 | 11/2003 | Lawless |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,727,506 B2 | 4/2004 | Mallette |
| 6,735,477 B2 | 5/2004 | Levine |
| 6,744,845 B2 | 6/2004 | Harding |
| 6,763,635 B1 | 7/2004 | Lowman |
| 6,765,527 B2 | 7/2004 | Jablonski |
| 6,768,317 B2 | 7/2004 | Moeller |
| 6,785,357 B2 | 8/2004 | Bernardi |
| 6,796,944 B2 | 9/2004 | Hall |
| 6,798,863 B2 | 9/2004 | Sato |
| 6,812,426 B1 | 11/2004 | Kotowski |
| 6,816,571 B2 | 11/2004 | Bijjani |
| 6,831,590 B1 | 12/2004 | Steinway |
| 6,837,422 B1 | 1/2005 | Meder |
| 6,839,134 B2 | 1/2005 | Saito |
| 6,839,403 B1 | 1/2005 | Kotowski |
| 6,843,599 B2 | 1/2005 | Le |
| 6,856,271 B1 | 2/2005 | Hausner |
| 6,876,322 B2 | 4/2005 | Keller |
| 6,891,381 B2 | 5/2005 | Bailey |
| 6,894,636 B2 | 5/2005 | Anderton |
| 6,920,197 B2 | 7/2005 | Kang |
| 6,922,460 B2 | 7/2005 | Skatter |
| 6,924,487 B2 | 8/2005 | Bolozdynya |
| 6,928,141 B2 | 8/2005 | Carver |
| 6,960,019 B2 | 11/2005 | Dammann |
| 6,965,314 B2 | 11/2005 | Bohinc, Jr. |
| 6,973,158 B2 | 12/2005 | Besson |
| 6,987,833 B2 | 1/2006 | Du |
| 7,010,094 B2 | 3/2006 | Grodzins |
| 7,039,159 B2 | 5/2006 | Muenchau |
| 7,045,788 B2 | 5/2006 | Iwatschenko-Borho |
| 7,066,023 B2 | 6/2006 | Herzen |
| 7,092,485 B2 | 8/2006 | Kravis |
| 7,099,434 B2 | 8/2006 | Adams |
| 7,103,137 B2 | 9/2006 | Seppi |
| 7,116,235 B2 | 10/2006 | Alioto |
| 7,130,484 B2 | 10/2006 | August |
| RE39,396 E | 11/2006 | Swift |
| 7,151,447 B1 | 12/2006 | Willms |
| 7,166,844 B1 | 1/2007 | Gormley |
| 7,207,713 B2 | 4/2007 | Lowman |
| 7,218,704 B1 | 5/2007 | Adams |
| 7,238,951 B2 | 7/2007 | Disdier |
| 7,244,947 B2 | 7/2007 | Polichar |
| 7,250,940 B2 | 7/2007 | Jayanetti |
| 7,260,255 B2 | 8/2007 | Polichar |
| 7,277,526 B2 | 10/2007 | Rifkin |
| 7,286,638 B2 | 10/2007 | Ledoux |
| 7,322,745 B2 | 1/2008 | Agrawal |
| 7,335,891 B2 | 2/2008 | Kniss |
| 7,352,843 B2 | 4/2008 | Hu |
| 7,356,115 B2 | 4/2008 | Ford |
| 7,366,282 B2 | 4/2008 | Peschmann |
| 7,368,717 B2 | 5/2008 | Verbinski |
| 7,369,642 B2 | 5/2008 | Eilbert |
| 7,369,643 B2 | 5/2008 | Kotowski |
| 7,372,040 B2 | 5/2008 | Polichar |
| 7,381,962 B2 | 6/2008 | Goldberg |
| 7,400,701 B1 | 7/2008 | Cason |
| 7,406,192 B2 | 7/2008 | Schmiegel |
| 7,417,440 B2 | 8/2008 | Peschmann |
| 7,420,174 B2 | 9/2008 | Kurita |
| 7,420,175 B2 | 9/2008 | Chu |
| 7,440,544 B2 | 10/2008 | Scheinman |
| 7,453,987 B1 | 11/2008 | Richardson |
| 7,461,032 B2 | 12/2008 | Heaton |
| 7,483,511 B2 | 1/2009 | Bendahan |
| 7,492,228 B2 | 2/2009 | Strange |
| 7,492,682 B2 | 2/2009 | Osakabe |
| 7,492,862 B2 | 2/2009 | Bendahan |
| 7,492,934 B2 | 2/2009 | Mundy |
| 7,505,556 B2 | 3/2009 | Chalmers |
| 7,505,557 B2 | 3/2009 | Modica |
| 7,505,562 B2 | 3/2009 | Dinca |
| 7,522,696 B2 | 4/2009 | Imai |
| 7,525,101 B2 | 4/2009 | Grodzins |
| 7,526,064 B2 | 4/2009 | Akery |
| 7,538,325 B2 | 5/2009 | Mishin |
| 7,547,888 B2 | 6/2009 | Cooke |
| 7,551,714 B2 | 6/2009 | Rothschild |
| 7,551,715 B2 | 6/2009 | Rothschild |
| 7,551,718 B2 | 6/2009 | Rothschild |
| 7,555,099 B2 | 6/2009 | Rothschild |
| 7,576,648 B2 | 8/2009 | Harman |
| 7,579,845 B2 | 8/2009 | Peschmann |
| 7,593,506 B2 | 9/2009 | Cason |
| 7,593,510 B2 | 9/2009 | Rothschild |
| 7,606,348 B2 | 10/2009 | Foland |
| 7,609,807 B2 | 10/2009 | Leue |
| 7,622,726 B2 | 11/2009 | Zillmer |
| 7,649,976 B2 | 1/2010 | Georgeson |
| 7,652,254 B2 | 1/2010 | Shpantzer |
| 7,653,545 B1 | 1/2010 | Starkie |
| 7,693,261 B2 | 4/2010 | Robinson |

(56) References Cited

U.S. PATENT DOCUMENTS

| | | |
|---|---|---|
| 7,701,336 B1 | 4/2010 | Willms |
| 7,714,297 B2 | 5/2010 | Morris |
| 7,724,869 B2 | 5/2010 | Wang |
| 7,738,687 B2 | 6/2010 | Tortora |
| 7,741,612 B2 | 6/2010 | Clothier |
| 7,750,294 B2 | 7/2010 | Bright |
| 7,760,103 B2 | 7/2010 | Frank |
| 7,783,003 B2 | 8/2010 | Clayton |
| 7,796,734 B2 | 9/2010 | Mastronardi |
| 7,800,073 B2 | 9/2010 | Clothier |
| 7,809,103 B2 | 10/2010 | Du |
| 7,809,104 B2 | 10/2010 | Foland |
| 7,809,109 B2 | 10/2010 | Mastronardi |
| 7,831,012 B2 | 11/2010 | Foland |
| 7,838,841 B2 | 11/2010 | Morris |
| 7,844,027 B2 | 11/2010 | Harding |
| 7,844,028 B2 | 11/2010 | Korsunsky |
| 7,856,081 B2 | 12/2010 | Peschmann |
| 7,860,213 B2 | 12/2010 | Akery |
| 7,876,879 B2 | 1/2011 | Morton |
| 7,908,121 B2 | 3/2011 | Green |
| 7,915,596 B2 | 3/2011 | Clothier |
| 7,945,105 B1 | 5/2011 | Jaenisch |
| 7,952,079 B2 | 5/2011 | Neustadter |
| 7,957,506 B2 | 6/2011 | Smith |
| 7,965,816 B2 | 6/2011 | Kravis |
| 7,978,804 B2 | 7/2011 | Groves |
| 7,982,191 B2 | 7/2011 | Friedman |
| 7,999,236 B2 | 8/2011 | McDevitt |
| 8,031,903 B2 | 10/2011 | Paresi |
| 8,102,251 B2 | 1/2012 | Webb |
| 8,116,428 B2 | 2/2012 | Gudmundson |
| 8,138,770 B2 | 3/2012 | Peschmann |
| 8,173,970 B2 | 5/2012 | Inbar |
| 8,179,597 B2 | 5/2012 | Namba |
| 8,194,822 B2 | 6/2012 | Rothschild |
| 8,233,586 B1 | 7/2012 | Boas |
| 8,247,767 B2 | 8/2012 | Morris |
| 8,263,938 B2 | 9/2012 | Bjorkholm |
| 8,274,377 B2 | 9/2012 | Smith |
| 8,275,091 B2 | 9/2012 | Morton |
| 8,288,721 B2 | 10/2012 | Morris |
| 8,325,871 B2 | 12/2012 | Grodzins |
| 8,389,941 B2 | 3/2013 | Bendahan |
| 8,389,942 B2 | 3/2013 | Morton |
| 8,428,217 B2 | 4/2013 | Peschmann |
| 8,451,974 B2 | 5/2013 | Morton |
| 8,483,356 B2 | 7/2013 | Bendahan |
| 8,502,699 B2 | 8/2013 | Zerwekh |
| 8,503,605 B2 | 8/2013 | Morton |
| 8,513,601 B2 | 8/2013 | Morris |
| 8,536,527 B2 | 9/2013 | Morris |
| 8,552,370 B2 | 10/2013 | Schultz |
| 8,582,720 B2 | 11/2013 | Morton |
| 8,674,706 B2 | 3/2014 | Peschmann |
| 8,735,833 B2 | 5/2014 | Morton |
| 8,975,593 B1 | 3/2015 | Best |
| 9,042,511 B2 | 5/2015 | Peschmann |
| 9,268,058 B2 | 2/2016 | Peschmann |
| 2002/0008655 A1 | 1/2002 | Haj-Yousef |
| 2002/0130267 A1 | 9/2002 | Odom |
| 2002/0150194 A1 | 10/2002 | Wielopolski |
| 2003/0009202 A1 | 1/2003 | Levine |
| 2003/0118246 A1 | 6/2003 | August |
| 2003/0179126 A1 | 9/2003 | Jablonski |
| 2003/0216644 A1 | 11/2003 | Hall |
| 2004/0017888 A1 | 1/2004 | Seppi |
| 2004/0057042 A1 | 3/2004 | Ovadia |
| 2004/0077943 A1 | 4/2004 | Meaney |
| 2004/0086078 A1 | 5/2004 | Adams |
| 2004/0104500 A1 | 6/2004 | Bross |
| 2004/0125914 A1 | 7/2004 | Kang |
| 2004/0140421 A1 | 7/2004 | Dammann |
| 2004/0141584 A1 | 7/2004 | Bernardi |
| 2004/0178339 A1 | 9/2004 | Gentile |
| 2004/0258198 A1 | 12/2004 | Carver |
| 2004/0267114 A1 | 12/2004 | Mundy |
| 2005/0023479 A1* | 2/2005 | Grodzins ............... G01T 3/06 250/390.11 |
| 2005/0058242 A1 | 3/2005 | Peschmann |
| 2005/0088644 A1 | 4/2005 | Morcom |
| 2005/0104603 A1 | 5/2005 | Peschmann |
| 2005/0105665 A1 | 5/2005 | Grodzins |
| 2005/0117700 A1 | 6/2005 | Peschmann |
| 2005/0120778 A1 | 6/2005 | Von |
| 2005/0135668 A1 | 6/2005 | Polichar |
| 2005/0156734 A1 | 7/2005 | Zerwekh |
| 2005/0157842 A1 | 7/2005 | Agrawal |
| 2005/0161611 A1 | 7/2005 | Disdier |
| 2005/0169421 A1 | 8/2005 | Muenchau |
| 2005/0180542 A1 | 8/2005 | Leue |
| 2005/0220246 A1 | 10/2005 | Masterov |
| 2005/0226383 A1 | 10/2005 | Rifkin |
| 2005/0244116 A1 | 11/2005 | Evans |
| 2005/0275545 A1 | 12/2005 | Alioto |
| 2006/0027751 A1 | 2/2006 | Kurita |
| 2006/0027759 A1 | 2/2006 | Jiang |
| 2006/0145771 A1 | 7/2006 | Strange |
| 2006/0176998 A1 | 8/2006 | Korsunsky |
| 2006/0284094 A1 | 12/2006 | Inbar |
| 2007/0085010 A1 | 4/2007 | Letant |
| 2007/0110215 A1 | 5/2007 | Hu |
| 2007/0140423 A1 | 6/2007 | Foland |
| 2007/0147585 A1 | 6/2007 | Eilbert |
| 2007/0160176 A1 | 7/2007 | Wada |
| 2007/0172129 A1 | 7/2007 | Tortora |
| 2007/0187608 A1 | 8/2007 | Beer |
| 2007/0189454 A1 | 8/2007 | Georgeson |
| 2007/0210255 A1 | 9/2007 | Bjorkholm |
| 2007/0228284 A1 | 10/2007 | Polichar |
| 2007/0241283 A1 | 10/2007 | Chu |
| 2007/0269005 A1 | 11/2007 | Chalmers |
| 2007/0272874 A1* | 11/2007 | Grodzins ............... G01T 1/2018 250/390.11 |
| 2007/0280416 A1 | 12/2007 | Bendahan |
| 2007/0280502 A1 | 12/2007 | Paresi |
| 2007/0286337 A1 | 12/2007 | Wang |
| 2008/0036597 A1 | 2/2008 | Harman |
| 2008/0037707 A1 | 2/2008 | Rothschild |
| 2008/0044801 A1 | 2/2008 | Modica |
| 2008/0048872 A1 | 2/2008 | Frank |
| 2008/0084963 A1 | 4/2008 | Clayton |
| 2008/0128624 A1 | 6/2008 | Cooke |
| 2008/0170655 A1 | 7/2008 | Bendahan |
| 2008/0175351 A1 | 7/2008 | Norman |
| 2008/0191140 A1 | 8/2008 | McDevitt |
| 2008/0283761 A1 | 11/2008 | Robinson |
| 2008/0296519 A1 | 12/2008 | Larsen |
| 2008/0298546 A1 | 12/2008 | Bueno |
| 2008/0304622 A1 | 12/2008 | Morton |
| 2008/0315091 A1 | 12/2008 | Morris |
| 2008/0316017 A1 | 12/2008 | Webb |
| 2009/0001277 A1 | 1/2009 | Payne |
| 2009/0045348 A1 | 2/2009 | Stuenkel |
| 2009/0086314 A1 | 4/2009 | Namba |
| 2009/0101824 A1* | 4/2009 | Beken ............... H01J 47/02 250/358.1 |
| 2009/0127459 A1 | 5/2009 | Neustadter |
| 2009/0134334 A1 | 5/2009 | Nelson |
| 2009/0140158 A1 | 6/2009 | Clothier |
| 2009/0175412 A1 | 7/2009 | Grodzins |
| 2009/0200480 A1 | 8/2009 | Clothier |
| 2009/0238336 A1 | 9/2009 | Akery |
| 2009/0257555 A1 | 10/2009 | Chalmers |
| 2009/0295576 A1 | 12/2009 | Shpantzer |
| 2009/0321653 A1 | 12/2009 | Perticone |
| 2010/0002834 A1 | 1/2010 | Gudmundson |
| 2010/0008666 A1 | 1/2010 | Kovsh |
| 2010/0025573 A1 | 2/2010 | Hahto |
| 2010/0034353 A1 | 2/2010 | Kravis |
| 2010/0065745 A1* | 3/2010 | Goldberg ............... G01T 1/2935 250/358.1 |
| 2010/0289409 A1 | 11/2010 | Rosenthal |
| 2010/0295689 A1 | 11/2010 | Armistead |

(56) References Cited

U.S. PATENT DOCUMENTS

| | | | |
|---|---|---|---|
| 2010/0301226 A1* | 12/2010 | Lacy | G01V 5/0075 250/391 |
| 2011/0038453 A1 | 2/2011 | Morton | |
| 2011/0051996 A1 | 3/2011 | Gudmundson | |
| 2011/0064192 A1 | 3/2011 | Morton | |
| 2011/0075808 A1 | 3/2011 | Rothschild | |
| 2011/0089332 A1 | 4/2011 | Ivan | |
| 2011/0096906 A1 | 4/2011 | Langeveld | |
| 2011/0135060 A1 | 6/2011 | Morton | |
| 2011/0204243 A1* | 8/2011 | Bendahan | G01T 1/167 250/367 |
| 2011/0235777 A1 | 9/2011 | Gozani | |
| 2011/0266451 A1* | 11/2011 | Achtzehn | G01T 3/06 250/362 |
| 2011/0266643 A1 | 11/2011 | Engelmann | |
| 2011/0291014 A1 | 12/2011 | Kusner | |
| 2011/0305318 A1 | 12/2011 | Robinson | |
| 2012/0223242 A1* | 9/2012 | Brown | G01T 3/008 250/391 |
| 2012/0236990 A1 | 9/2012 | Rothschild | |
| 2012/0261572 A1 | 10/2012 | Schmidt | |
| 2012/0312985 A1 | 12/2012 | Morris | |
| 2013/0039462 A1 | 2/2013 | Morton | |
| 2013/0039472 A1 | 2/2013 | Morton | |
| 2013/0081451 A1 | 4/2013 | Kamada | |
| 2013/0294574 A1 | 11/2013 | Peschmann | |
| 2013/0343520 A1 | 12/2013 | Grodzin | |
| 2014/0319365 A1* | 10/2014 | Sossong et al. | G01V 5/0016 250/394 |
| 2015/0133787 A1 | 5/2015 | Wegner | |
| 2015/0212014 A1 | 7/2015 | Sossong | |
| 2015/0241593 A1 | 8/2015 | Blanpied | |
| 2015/0246244 A1 | 9/2015 | Sossong | |
| 2015/0279489 A1 | 10/2015 | Milner | |
| 2015/0287237 A1 | 10/2015 | Bai | |
| 2015/0325013 A1 | 11/2015 | Patnaik | |
| 2016/0025888 A1 | 1/2016 | Peschmann | |
| 2016/0041297 A1 | 2/2016 | Blanpied | |

FOREIGN PATENT DOCUMENTS

| | | |
|---|---|---|
| CA | 2636306 A1 | 9/2009 |
| CN | 101443679 A | 5/2009 |
| CN | 101460003 | 6/2009 |
| CN | 101504463 | 8/2009 |
| EP | 0077018 A1 | 4/1983 |
| EP | 0146255 A2 | 6/1985 |
| EP | 0176314 | 4/1986 |
| EP | 0287707 | 10/1988 |
| EP | 0391237 A1 | 10/1990 |
| EP | 0919186 A2 | 6/1999 |
| EP | 1348982 A2 | 10/2003 |
| EP | 1413898 A1 | 4/2004 |
| EP | 1526392 | 4/2005 |
| GB | 516517 A | 1/1940 |
| GB | 2255634 A | 11/1992 |
| GB | 2299251 | 9/1996 |
| GB | 2424065 A | 9/2006 |
| GB | 2438317 A | 11/2007 |
| GB | 2463550 | 3/2010 |
| JP | 01100493 A * | 4/1989 |
| WO | 9855851 A1 | 12/1998 |
| WO | 2004010127 A1 | 1/2004 |
| WO | 2005098400 A2 | 10/2005 |
| WO | 2005121756 A2 | 12/2005 |
| WO | 2006036076 A1 | 4/2006 |
| WO | 2006045019 | 4/2006 |
| WO | 2006078691 A2 | 7/2006 |
| WO | 2006095188 | 9/2006 |
| WO | 2007035359 A2 | 3/2007 |
| WO | 2007051092 | 5/2007 |
| WO | 2007068933 A1 | 6/2007 |
| WO | 2008017983 A2 | 2/2008 |
| WO | 2009106803 | 9/2009 |
| WO | 2009141613 | 11/2009 |
| WO | 2009141615 | 11/2009 |
| WO | 2009150416 A2 | 12/2009 |
| WO | 2011008718 | 1/2011 |
| WO | 2011069024 A1 | 6/2011 |
| WO | 2011087861 | 7/2011 |
| WO | 2011095810 | 8/2011 |
| WO | 2011095942 A2 | 8/2011 |
| WO | 2011106463 A1 | 9/2011 |
| WO | 2011133384 | 10/2011 |
| WO | 2011142768 A2 | 11/2011 |
| WO | 2012109273 | 8/2012 |
| WO | 2012174265 | 12/2012 |
| WO | 2013116241 A1 | 8/2013 |
| WO | 2013181646 A2 | 12/2013 |
| WO | 2015004471 A1 | 1/2015 |
| WO | 2015038554 | 3/2015 |
| WO | 2015057973 | 4/2015 |

OTHER PUBLICATIONS

Sheen, David et al. 'Three-Dimensional Millimeter-Wave Imaging for Concealed Weapon Detection', Sep. 2001, IEEE Transactions on Microwave Theory and Techniques, vol. 49, No. 9, pp. 1581-1592.

Office Action dated Mar. 18, 2015 for U.S. Appl. No. 14/165,177.

Notice of Allowance dated Aug. 20, 2015 for U.S. Appl. No. 14/165,177.

Notice of Allowance dated Nov. 6, 2015 for U.S. Appl. No. 14/516,146.

Corrected Notice of Allowance dated Mar. 14, 2016 for U.S. Appl. No. 14/516,146.

International Search Report for PCT/US14/60914, mailed on Feb. 4, 2015, Rapiscan Systems Inc.

Hasuko et al, "The First Integration Test of the Atlas End-Cap Muon Level 1 Trigger System", IEEE Transactions on Nuclear Science, vol. 50, No. 4, Aug. 2003 (2003), pp. 864-868.

Cortesi et al, "Investigations of a THGEM-based imaging detector", Institute of Physics Publishing and SISSA, Sep. 4, 2007.

Notice of Allowance dated Jan. 13, 2015 for U.S. Appl. No. 13/858,479.

Notice of Allowance dated May 14, 2016 for U.S. Appl. No. 14/516,146.

Blanpied et al, "Material discrimination using scattering and stopping of cosmis ray muons and electrons: Differentiating heavier from lighter metals as well as low-atomic weight materials", Nuclear Instruments and Methods in Physics Research A, 784 (2015) 352-358.

Mobile X-Ray Inspection Systems, Internet Citation, Feb. 12, 2007, pp. 1-2, URL:http://web.archive.org/web/20070212000928/http://www.bombdetecti- on.com/cat--details.php?catid=20.

Molchanov P A et al: 'Nanosecond gated optical sensors for ocean optic applications' Sensors Applications Symposium, 2006. Proceedings of the 2006 IEEE Houston, Texas,USA Feb. 7-9, 2006, Piscataway, NJ, USA,IEEE, Feb. 7, 2006 (Feb. 7, 2006), pp. 147-150, XP010917671 ISBN: 978-0-7803-9580-0.

International Search Report PCT/GB2009/000515, Feb. 23, 2010, Rapiscan Security Products, Inc.

International Search Report for PCT/GB2009/000497, Jan. 22, 2010.

International Search Report PCT/GB2009/001444, Apr. 6, 2010, Rapiscan Security Products.

International Search Report for PCT/GB2009/000556, Feb. 19, 2010, Rapiscan Security Products, Inc.

International Search Report PCT/GB2009/001277, Jul. 20, 2010, Rapiscan Systems, Inc.

International Search Report for PCT/GB2009/001275, Jul. 24, 2009, Rapiscan Security Products Inc.

International Search Report for PCT/GB2009/001250, Mar. 2, 2010, Rapiscan Security Products Inc.

International Search Report for PCT/US2010/061908, mailed on Apr. 2, 2012, Rapiscan Systems, Inc.

International Search Report for PCT/GB2006/000859, mailed on May 19, 2006, Corus UK Ltd.

(56) References Cited

OTHER PUBLICATIONS

Examination Report for GB1212492.1, dated Mar. 16, 2016.
Full Examination Report for Australian Application No. 2013215286, Jul. 30, 2015.
Office Action for Canadian Patent Application No. 2863633, dated Nov. 3, 2015.
First Office Action for Chinese Patent Application No. 2013800149382, dated Dec. 18, 2015.
International Search Report for PCT/US13/23676, Jun. 28, 2013.
Supplementary Partial European Search Report for EP13744250, completed on Sep. 7, 2015.
King et al, 'Development of B-Based He Replacement Neutron Detectors', AIP Conf. Proc. 1412, 216-223 (2011);doi: 10.1063/1.3665317.
International Search Report for PCT/US10/35048; Rapiscan Security Products, Inc.; Feb. 8, 2012.
Office Action dated May 16, 2016 for U.S. Appl. No. 14/531,437.
Office Action for Canadian Patent Application No. 2,863,363, dated Nov. 3, 2015.
European Search Report for EP12801343.0, Jun. 10, 2015.
International preliminary report on patentability PCT/US2012/024184, issued on Aug. 13, 2013, Rapiscan Systems Inc.
International Search Report PCT/US2012/024184, mailed on Jul. 27, 2012, Rapiscan Systems Inc.
International Search Report PCT/US2012/042493, mailed on Oct. 1, 2012, Rapiscan Systems Inc.
Jupiter, CP. and Parez, J. "A Study of the Scintillation Properties of Various Hydrogenous and Non-Hydrogenous Solutes Dissolved in Hexafluorobenzene" IEEE Transactions on Nuclear Science, Feb. 1966, pp. 692-703.
Wait, G.D. "A Hexafluorobenzene Gamma Disimeter for Use in Mixed Neutron and Gamma Fields" Jan. 1968, AD0678658, Abstract.
Wolf, A., Moreh, R., "Utilization of teflon-covered GE(Li) diodes for fast neutron detection," Nuclear Instruments and Methods, 148, 1978, 195-197.
Office Action dated Aug. 7, 2015 for U.S. Appl. No. 13/035,886.
Little, R.C.; Chadwick, M. B.; and Myers, W.L. "Detection of Highly Enriched Uranium Through Active Interrogation" Proceedings of the 11th International Conference on Nuclear Reaction Mechanics in Varenna, Italy, Jun. 2006.
Office Action dated Dec. 2, 2015 for U.S. Appl. No. 13/035,886.
"Linac based photofission inspection system employing novel detection concepts", Nuclear Instruments and Methods (2011), vol. 653, Stevenson et al, pp. 124-128.
"Neutron threshold activation detectors (TAD) for the detection of fissions", Nuclear Instruments and Methods in Physics Research (2011), vol. 652, Gozani et al., pp. 334-337.
Examination Report for GB1215374.8, dated Mar. 29, 2016.
Barnabe-Heider et al.: 'Characterization of the Response of Superheated Droplet (Bubble) Detectors.' arxiv.org, [Online] Nov. 14, 2003, pp. 1-2 Retrieved from the Internet: &It;URL:http://arxiv.org/PS_cache/hep-ex/pdf/0311/0311034v1.pdf> [retrieved on Nov. 8, 2011].
Third Office Action for CN2011800208127, Jun. 13, 2015.
Fourth Office Action for for CN2011800208127, Aug. 2015.
Office Action dated Jan. 9, 2015 for U.S. Appl. No. 14/268,128.
Notice of Allowance dated Aug. 6, 2015 for U.S. Appl. No. 14/268,128.
International Search Report PCT/US2011/025969, mailed on Aug. 1, 2011, Rapiscan Systems Inc.
International Search Report for PCT/GB2014/052110, Dec. 3, 2014.
Rolfe et al, "Long Ion Chamber Systems for the SLC" IEEE Particle Accelerator Conference, Chicago, Illinois [online], Mar. 20-23, 1989 [retrieved on Aug. 16, 2011]. Retrieved from the Internet: <URL: http://www.slac.stanford.edu/cgi-wrap/getdoc/slac-pub-4925.pdf> title, abstract, introduction, p. 1 col. 1, para 1, 2, 5; p. 2, col. 1, para 1.
Requirements Letter for Second office action for Mexican Application No. 2012012175, Feb. 5, 2015.
Third Office Action for Mexican Patent Application No. 2012012175, Jul. 22, 2015.
Shafer, Robert E. 'A Tutorial on Beam Loss Monitoring'. Published in Beam Instrumentation Workshop 2002: Tenth Workshop [online] p. 44-58, Smith, G. A., and Russo, T., eds, American Institute of Physics, Brookhaven, May 2002 [retrieved on Aug. 16, 2011]. Retrieved from the Internet: http://ab-div-bdi-bl-blm.web.cern.ch/ab-div-bdi-bl-blm/Beam_loss_detectors/Literature/schaefer_biw022_tutorial.pdf.
International Search Report, PCT/US11/32440, date of mailing Sep. 9, 2011, Rapiscan Systems Inc.
International Atomic Energy Agency, Manual for troubleshooting and upgrading of neutron generators. Nov. 1996 [retreived on Sep. 16, 2013]. Retrieved from the Internet: <URL: http://www-pub.iaea.org/MTCD/publications/PDF/te_913_web.pdf> figures 149-150, pp. 200-203.
Patent Examination Report No. 1 for Australian Patent Application No. 2013267091, dated May 4, 2016.
First Office Action for CN2013800348333, dated Mar. 14, 2016.
Office Action dated Dec. 29, 2014 for U.S. Appl. No. 13/907,811.
International Search Report for PCT/US13/43801, Dec. 6, 2013.
International Search Report for PCT/US10/58809; Rapiscan Systems Inc.; Apr. 19, 2011.
Search and Examination Report for Application No. GB1420349.1, dated Nov. 26, 2014.
Office Action dated Dec. 10, 2012 for U.S. Appl. No. 12/959,356.
Notice of Allowance dated Apr. 22, 2015 for U.S. Appl. No. 13/907,811.
Notice of Allowance dated May 5, 2015 for U.S. Appl. No. 14/047,477.

* cited by examiner

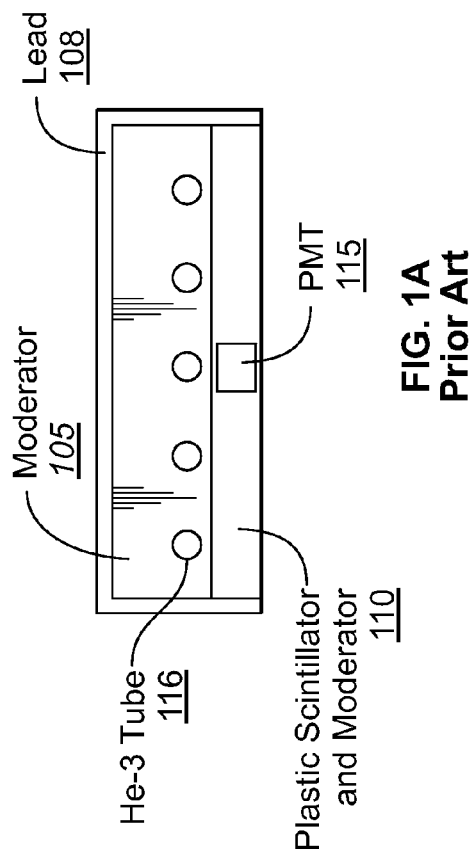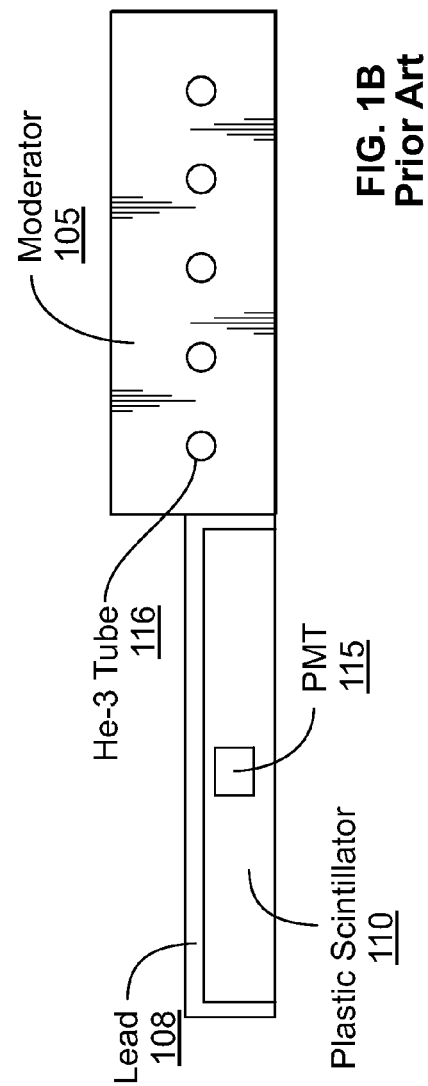

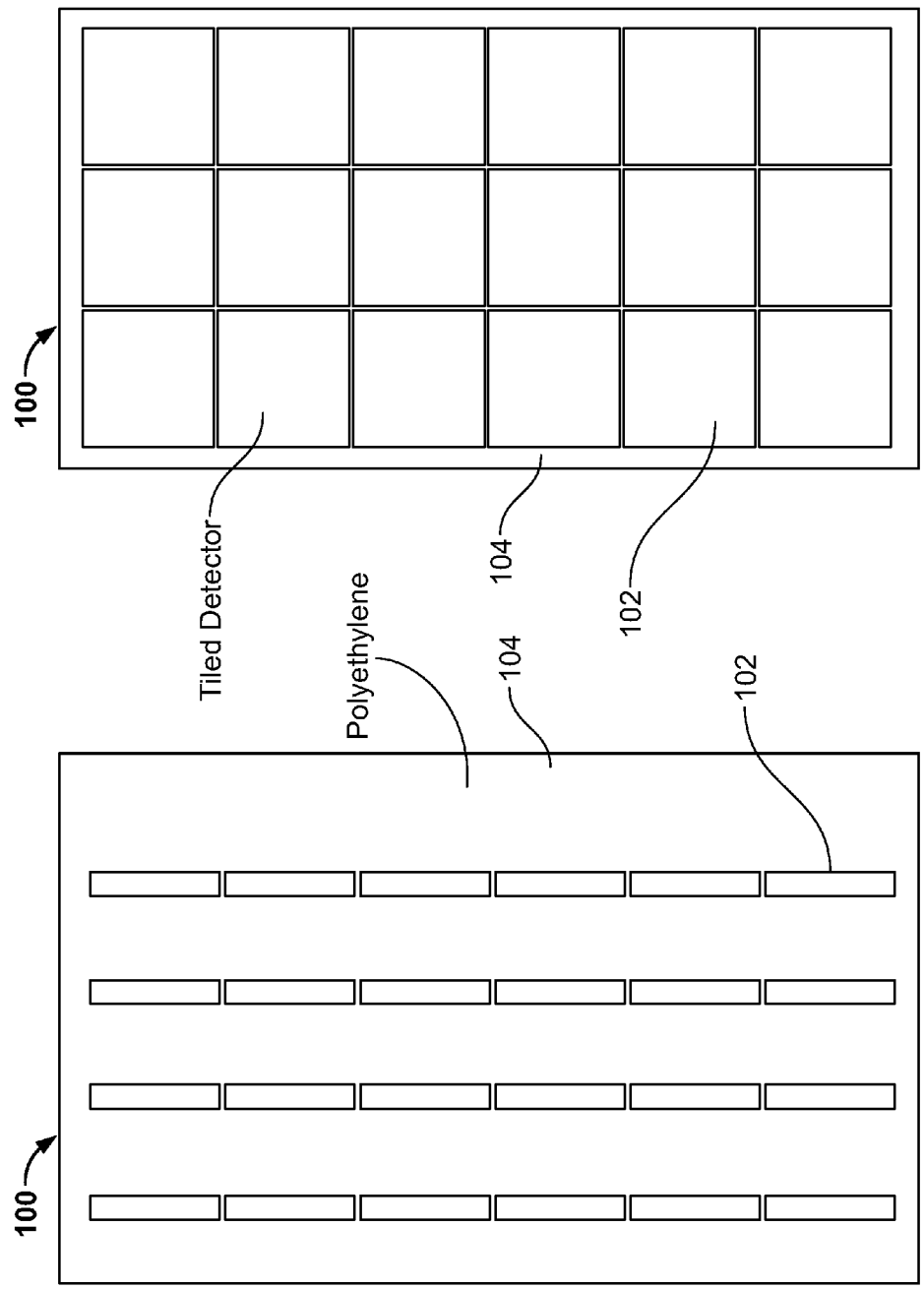

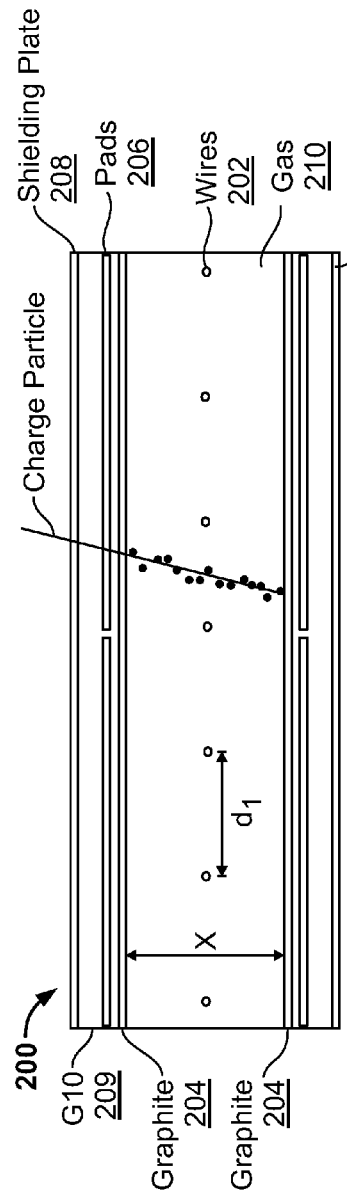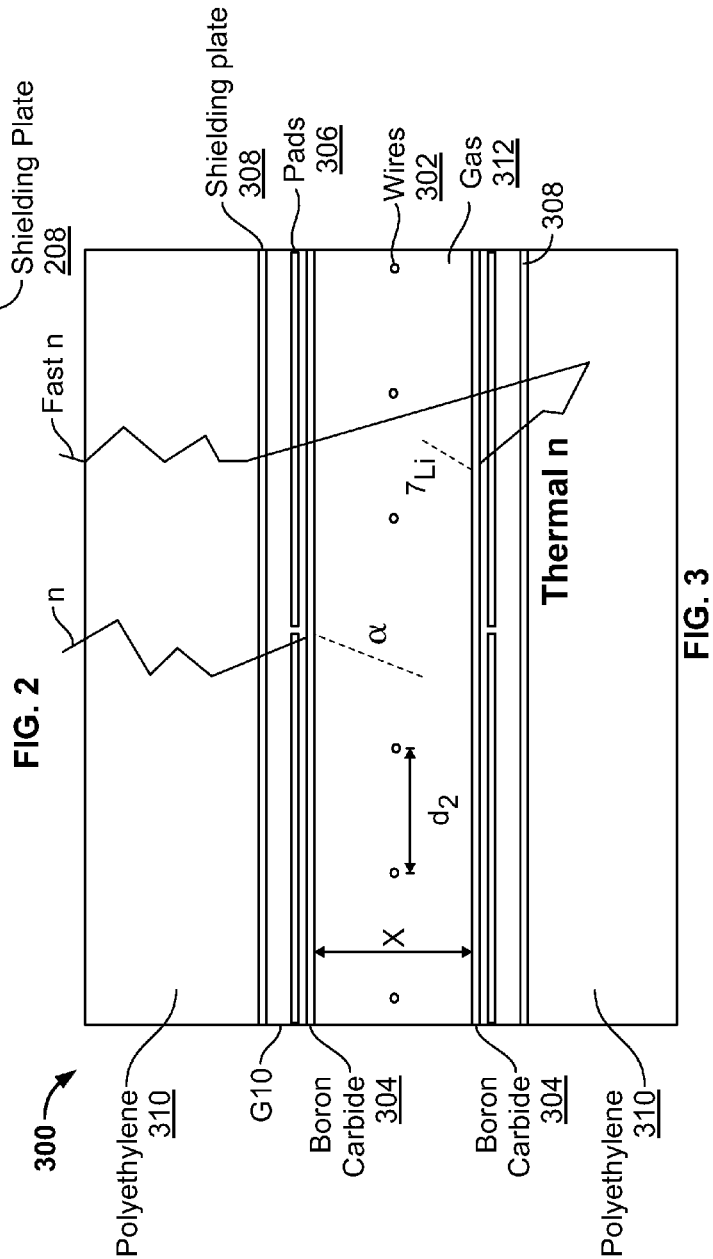
FIG. 2
FIG. 3

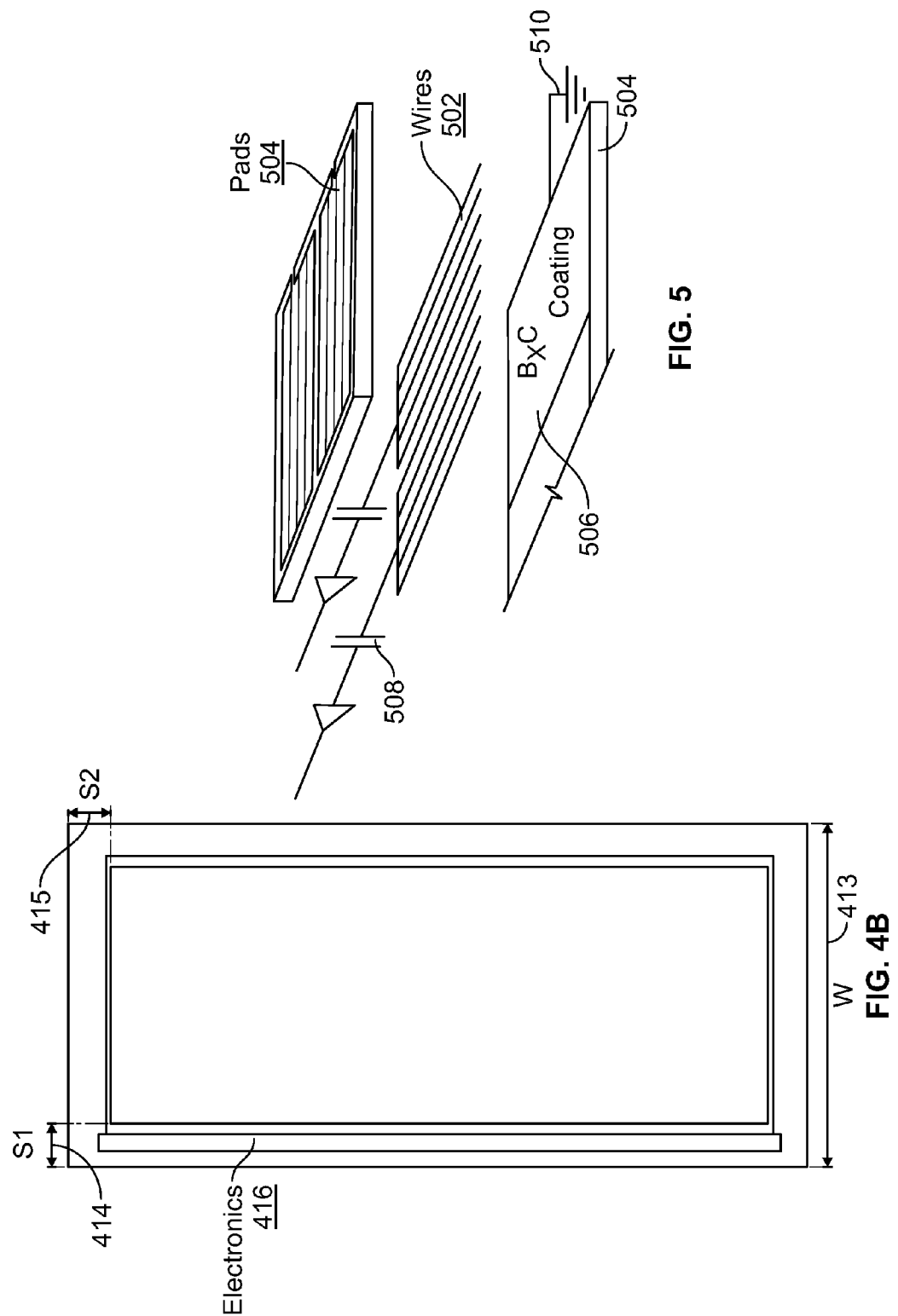

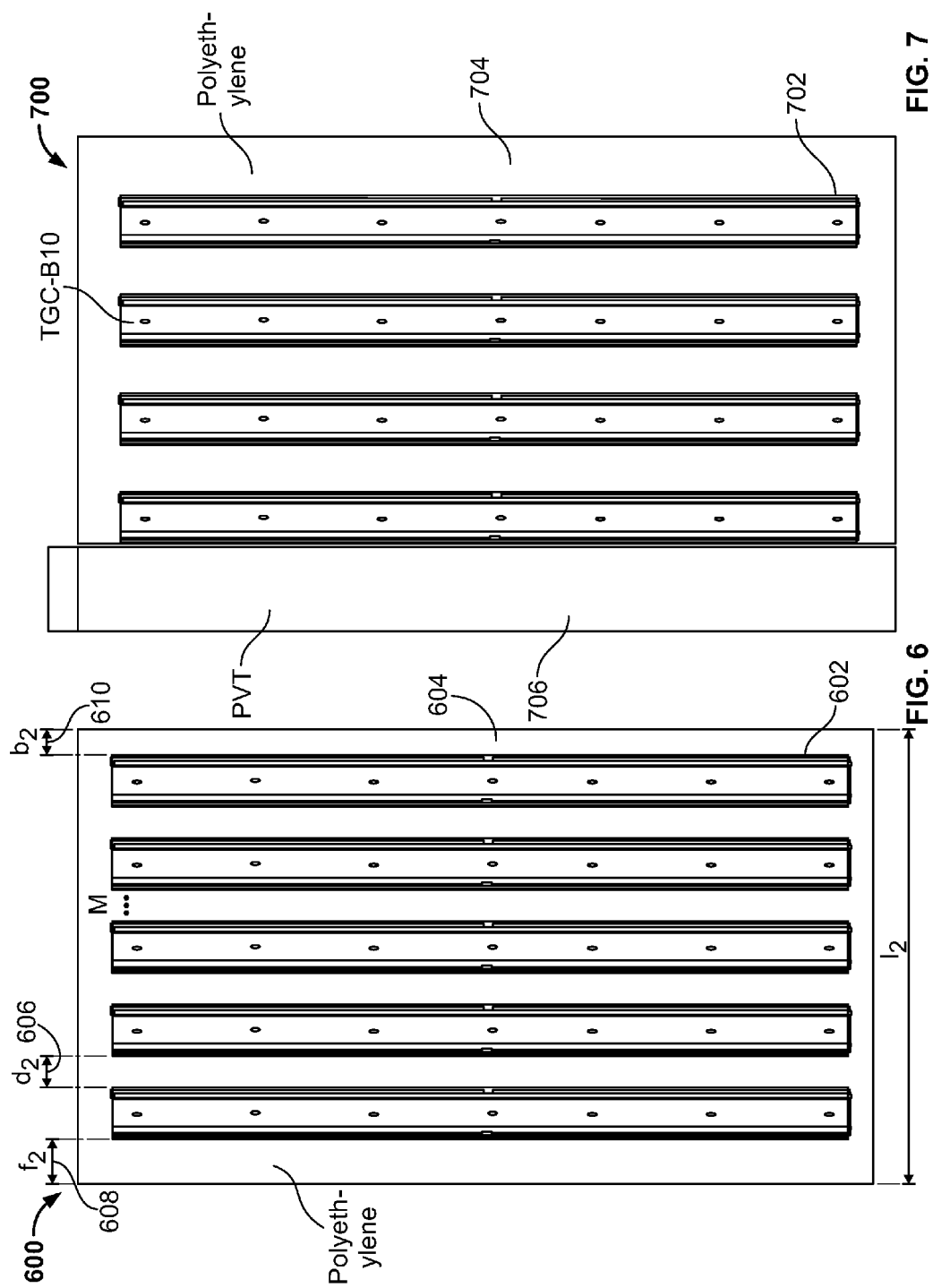

THIN GAP CHAMBER NEUTRON DETECTORS

CROSS-REFERENCE TO RELATED APPLICATIONS

The present specification relies upon U.S. Provisional Patent Application No. 61/925,025, entitled "Neutron Detector Based Thin Gap Chamber Technology", filed on Jan. 8, 2014, which is herein incorporate by reference in its entirety.

In addition, the present specification relates to U.S. patent application Ser. No. 13/753,458, entitled "Composite Gamma Neutron Detection System", filed on Jan. 29, 2013, which is herein incorporated by reference in its entirety.

FIELD

The present specification generally relates to the detection of radioactive materials, and specifically, to a neutron-based detection system and method that is cost-effective, compact, and can be fabricated in various sizes, from small to large area detectors, from readily available materials.

BACKGROUND

Physical shipment of materials, including the shipment of mail, merchandise, raw materials, and other goods, is an integral part of any economy. Typically, the materials are shipped in a type of shipping container or cargo box. Such containers or boxes include semi-trailers, large trucks, and rail cars as well as inter-modal containers that can be carried on container ships or cargo planes. However, such shipping or cargo containers can be used for illegal transportation of contraband such as nuclear and radioactive materials. Detection of these threats require a rapid, safe and accurate inspection system for determining the presence of hidden nuclear materials, especially at state and national borders, along with transit points such as airports and shipping ports.

Currently, both passive and active detection techniques are employed for the detection of concealed nuclear materials. Passive detection techniques are based on the principle that nuclear and radiological threats emit gamma radiation and, in some cases, neutron radiation both of which can be detected.

Active detection techniques, such as Differential Die-away Analysis (DDAA) and measurements of delayed gamma-rays and neutrons following either neutron- or photon-induced fission can be used to detect the presence of fissile materials. The radiation is measured with neutron and gamma-ray detectors, preferentially insensitive to each other's radiation. Detection of delayed neutrons is an unequivocal method to detect fissile materials compared to delayed gamma rays. However, because the number of delayed neutrons is two orders of magnitude lower than the number of delayed gamma rays, efficient and large area detectors are required for best sensitivity in neutron detection.

The most commonly used neutron detector is a Helium-3 (He-3) gas proportional chamber. In this system, He-3 interacts with a neutron to produce triton and proton ions. These ions are accelerated in the electric field of the detector to the point that they become sufficiently energetic to cause ionization of gas atoms. In a controlled environment, an avalanche breakdown of the gas can be generated, which results in a measurable current pulse at the output of the detector. By pressurizing the gas, the probability of a passing thermal neutron interacting in the gas can be increased to a reasonable level. However, He-3 is a relatively scarce material and it does not occur naturally. This makes the availability and future supply of such detectors somewhat uncertain. Further, a special permit is required to transport pressurized He-3 tubes, which can be cumbersome and potentially problematic.

The most common globally deployed passive radioactive material detectors employ a neutron moderator with one or more 2 inch He-3 detector tubes. For DDAA applications, wherein there is a need for a fast-time response, currently available detectors consist of many smaller diameter He-3 tubes. However, as described above, currently available neutron detectors have design complexities and require materials which are scarce in nature, such as He-3, which makes it difficult to develop large area and high efficiency detectors.

Currently available active detection systems also suffer from some drawbacks. In particular, these devices generally utilize accelerators that produce high energy neutrons with a broad spectrum of energies. The absorption/scattering of neutrons traveling at specific energies is difficult to detect given the large number of neutrons that pass through the object without interaction. Thus, the "fingerprint" generated from these devices is extremely small, difficult to analyze, and often leads to significant numbers of false positive or false negative test results.

In addition, conventional detection systems have limitations in their design and method that prohibit them from achieving low radiation doses, which poses a risk to the personnel involved in inspection as well as to the environment, or reduces the statistical accuracy of the detection procedure, which are prerequisites for commercial acceptance.

FIG. 1A and FIG. 1B depict conventional neutron and gamma ray detection systems. As shown in FIG. 1A, the most common globally deployed passive radioactive material detectors employ: a neutron moderator 105 having a plurality of He-3 detector tubes 116 embedded therein and covered by a lead shield 108 to attenuate background gamma-rays impinging from the back of the detector; and, a portion comprising a plastic scintillator 110 with a photo multiplier tube (PMT) 115 to detect gamma rays. The plastic scintillator 110 also functions as a moderator.

This detector configuration employs the scarce element He-3. Another commonly deployed detector wherein the gamma-ray and neutron detectors are separate is shown in FIG. 1B. Referring to FIG. 1B, the neutron moderator 105, comprising a plurality of He-3 detector tubes 116, is positioned adjacent to plastic scintillator 110, which comprises a PMT 115 and a lead shield 108. This detector configuration, however, also employs the scarce He-3 and takes up a larger footprint.

Several alternative detectors to replace He-3 detectors have been identified and/or fabricated. One solution is a system using boron-10 (B10) lined proportional counter tubes. However, in this case, large size detectors are needed to produce similar efficiency as is available in He-3 based detectors. The large size also results in long response times making these detectors not well suited for DDAA applications. Variants of these detectors include thin-walled straws lined with enriched boron carbide ($^{10}B_4C$). Although these detectors can produce fast response times, there is a need for hundreds of straws increasing the complexity and cost of the detector.

Other alternative neutron detectors include those based on lithium-6 ($^6Li$) fibers; however, these require pulse-shape discrimination (PSD) to reduce the gamma-ray background, which makes the detector design significantly more complex and expensive. Also, these detectors are not well suited for fast-timing applications.

There are also neutron detectors fabricated from parallel plates coated with B10 containing materials. However, these detectors have limitations that result in making the detector unit large, requiring tiling, thus making the system complex and difficult to assemble.

While the use of both passive and active detection techniques is desirable, what is needed is a neutron and gamma-ray based detection system and method that is cost-effective, compact, and wherein the neutron detector can be fabricated in various sizes, from small to large areas from readily available materials.

There is also a need for large-area detectors for passive applications for the detection of radioactive and special nuclear materials in stationary installations for fast moving objects such as trains or for mobile-installed detectors. Further, there is a need to increase detection efficiency and coverage for DDAA applications where special nuclear material (SNM) is hidden deep in cargo.

Additionally, it would be useful to measure neutrons and gamma rays simultaneously with muon detection to increase the statistical accuracy of the passive measurements. Therefore, there is also a requirement for integrated detection systems which can detect muons along with neutrons and gamma rays that are easy to fabricate.

SUMMARY OF THE INVENTION

In some embodiments, the present specification discloses a system for detection of neutrons, comprising: a plurality of thin gap chambers comprising a thermal neutron absorber material, wherein said thermal neutron absorber material is adapted to function as a cathode and is configured to interact with slow neutrons to emit charged particles and a gaseous substance positioned to interact with said charged particles to produce a signal; a moderator material positioned proximate to the thin gap chambers to decrease a speed of fast neutrons; and an electronics system to process said signal.

Optionally, the thermal neutron absorber material comprises a $^6Li$ containing material. Still optionally, the thermal neutron absorber material comprises at least one of $^{10}B_4C$ or $^{10}B_8C$.

Optionally, the thermal neutron absorber material has a thickness of approximately 1 µm.

In some embodiments, the moderator may be polyethylene.

In some embodiments, multiple thin gap chambers may be stacked to increase detection efficiency.

Optionally, a thickness of the moderator material and/or thickness of the thermal neutron absorber material are adjusted to modify the response time of the detector.

In some embodiments, the thickness of the moderator material may be in a range of 0.2 to 2 cm. Optionally, to achieve a fast response time, the thickness of the moderator material employed may be approximately 0.5 cm. Optionally, for passive detection applications, the thickness of the moderator material used is approximately 1 cm.

Optionally, a plastic scintillator material is positioned on a front portion of detector to detect gamma rays. Still optionally, the plastic scintillator comprises polyvinyl toluene (PVT).

In some embodiments, a plurality of thin gap chambers are configured to simultaneously detect muons to determine a presence of high atomic-number materials and neutrons.

Optionally, said gaseous substance comprises a mixture of n-pentane and $CO_2$.

In some embodiments, the present specification discloses a system for simultaneous detection of scattered muons, to detect a presence of high-Z materials, and neutrons emitted from radioactive materials concealed in a cargo comprising: at least two thin gap chambers placed above the cargo and at least two thin gap chambers placed below the cargo wherein each of said thin gap chambers contains a gaseous substance and comprises an array of wires that is configured to be an anode and at least one layer of thermal neutron absorber material is configured to be a cathode; a moderator material positioned proximate each thin gap chamber to decrease a speed of incoming fast neutrons; and a controller to detect and process signals, generated in said array or wires, representative of neutron and muon radiation intensity.

Optionally, a gamma ray detector is positioned facing the cargo such that gamma rays can be simultaneously detected along with neutrons and muons.

Optionally, said thermal neutron absorber material may comprise at least one of boron carbide such as in the form of $^{10}B_4C$ or $^{10}B_8C$, or $^6Li$.

In some embodiments, for muon detection, the two thin gap chambers above the cargo detect a first coordinate and an angle of incidence of incoming muons and the two thin gap chambers below the cargo detect a second coordinate and an angle of exit of the muons.

In some embodiments, muon particles are detected based on recording of signals in two or more thin gap chambers and neutrons are detected based on recording of signals in only one thin gap chamber.

In some embodiments, the present specification discloses a system for simultaneous detection of scattered muons, a presence of high-Z materials, gamma rays and neutrons emitted from radioactive materials concealed in a cargo comprising: at least two thin gap chambers placed above the cargo and at least two thin gap chambers placed below the cargo wherein each of said thin gap chambers is filled with a gaseous substance and comprises an array of wires that function as an anode and at least one layer of thermal neutron absorber material that functions as a cathode; a moderator material positioned near each thin gap chamber to slow down the incoming fast neutrons; a gamma-ray detector placed facing the cargo; and a controller to detect signals representative of neutron, gamma and muon radiation strength.

In some embodiments, the present specification discloses a system for the detection of special nuclear and radioactive materials concealed in cargo, comprising: at least two thin gap chambers to detect muons placed above the cargo to detect a first coordinate and an angle of incidence of incoming muons, at least two thin gap chambers to detect muons placed below the cargo to detect a second coordinate and an angle of exit of the scattered muons, wherein the thin gap chamber detectors comprise a thermal neutron absorber material used as a cathode, said material interacting with slow neutrons to emit charged particles, and said charged particles interacting with a gaseous substance in the chamber to produce at least one signal; a moderator material placed near the thin gap chambers to slow down the fast neutrons; and, a processing system for measuring and processing said at least one signal representative of muon and neutron information.

Optionally, the moderator placed in the thin gap chamber facing the cargo is replaced with one or more plastic scintillators to measure the gamma rays emanating from the object. Still optionally, the distance between two adjacent thin gap chambers is 0.4 m. Still optionally, the dimensions of the thin gap chamber detectors range from 3 m×3 m to 4 m×4 m.

In some embodiments, the present specification discloses a neutron detection system comprising: a plurality of thin gap chambers wherein each chamber is filled with a gaseous substance and comprises an array of wires that function as an anode and at least one layer of thermal neutron absorber material that functions as a cathode; and, a moderator positioned near each thin gap chamber to slow down incident fast neutrons, wherein said thermal neutron absorber material interacts with slow neutrons coming through the moderator material and emits charged particles in the chamber which on interaction with the gaseous mixture produces a signal indicative of the presence of neutron radiation.

Optionally, said thermal neutron absorber material comprises at least one of boron carbide enriched with $^{10}$B or $^6$Li.

Optionally, the plurality of thin gap chambers may be stacked to increase detection efficiency and the spacing between adjacent chambers is adjusted to modify the response time of detection system.

Optionally, the neutron detection system further comprises a layer of plastic scintillator material in a front portion to enable additional detection of gamma radiation.

The aforementioned and other embodiments of the present shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 1A illustrates a conventional radioactive material detector comprising a He-3 based neutron detector with a moderator and a plastic scintillator to detect gamma rays;

FIG. 1B illustrates another conventional radioactive material detector comprising a He-3 based detector with a neutron moderator and a plastic scintillator to detect gamma rays;

FIG. 1C illustrates a side cross-sectional view of a conventional parallel-plate neutron detector that is tiled to cover a large area;

FIG. 1D illustrates a front cross-sectional view of a conventional parallel-plate neutron detector shown in FIG. 1C;

FIG. 2 illustrates a conventional thin gap chamber (TGC) used to detect charge particles;

FIG. 3 illustrates a TGC-based neutron detector in accordance with an embodiment of the present specification;

FIG. 4B illustrates a front cross-sectional view of the neutron detector shown in FIG. 4A;

FIG. 5 illustrates an embodiment of the electrical connections of the TGC detector shown in FIG. 4A;

FIG. 6 illustrates a stack of TGC detectors designed for providing a fast response time, in accordance with an embodiment of the present specification;

FIG. 7 illustrates a detection system comprising modified TGC detector for detecting neutrons and gamma rays in accordance with an embodiment of the present specification; and, FIG. 8 illustrates an integrated detection system for inspecting a cargo for neutrons, muons and gamma radiation in accordance with an embodiment of the present specification.

DETAILED DESCRIPTION

Figure 4A:
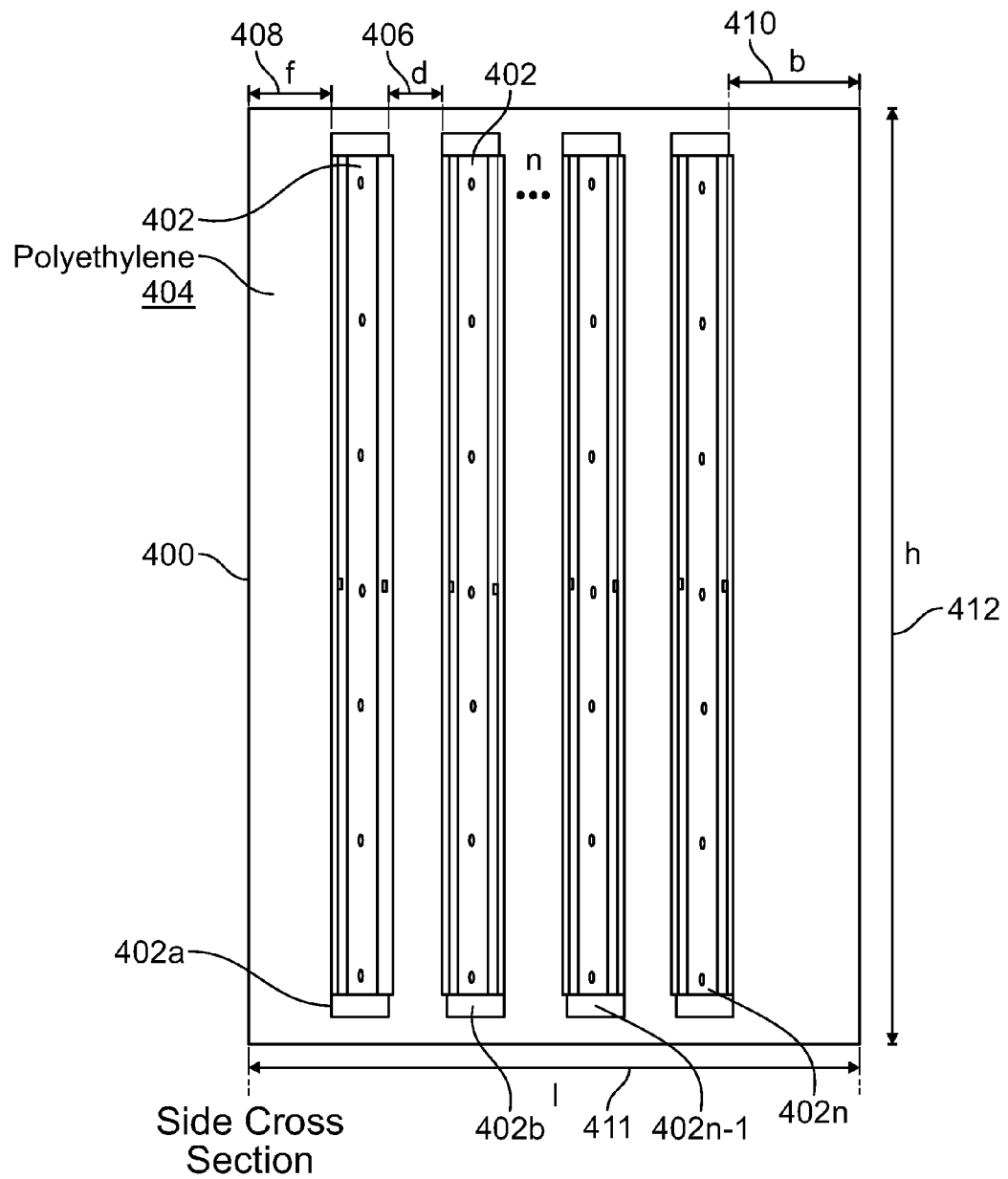
FIG. 4A illustrates a side cross-sectional view of a neutron detector comprising a plurality of thin gap chambers embedded in a moderator, in accordance with one embodiment of the present specification.

The present specification is directed towards a neutron detection system which is efficient, cost effective and suitable for large area deployment.

Most commonly deployed neutron detectors use Helium-3 tubes. However, the limited availability of He-3 raises concerns about the future availability of these detectors. In an embodiment, the present specification discloses neutron detection systems which have faster response times for active interrogation applications and can be fabricated using readily available materials unlike the Helium-3 based neutron detectors.

In an embodiment, the present specification describes a neutron detector based on thin gap chamber technology. In an embodiment, the present specification describes a novel thin gap chamber comprising a layer of thermal neutron absorber material which functions as a cathode. In an embodiment, the thermal neutron absorber material absorbs the incident thermal neutrons and emits charged particles which interacts with a gaseous mixture in the thin gap chamber and produces a signal representative of the strength of incident neutron radiation. In an embodiment, the thermal neutron absorber material comprises a thin layer of $^6$Li or boron carbide which in an embodiment is in the form of $^{10}$B$_4$C or $^{10}$B$_8$C. In an embodiment, the present specification describes a neutron detection system comprising multiple thin gap chambers stacked together to enhance the detection efficiency. In another embodiment, the thickness of the moderator in adjacent thin gap chambers and/or the thickness of the thermal neutron absorber can be adjusted to modify the response time and efficiency of the detector depending on the application.

In an embodiment, the present specification describes a novel dual detection system based on a modified thin gap chamber technology which can be used for simultaneous detection of neutrons and gamma rays.

In another embodiment, the present specification describes a novel integrated detection system and a unique design configuration which can be used to detect muons, neutrons and gamma rays.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

U.S. Pat. No. 8,389,941, entitled "Composite Gamma Neutron Detection System" and filed on Dec. 22, 2009; U.S. patent application Ser. No. 13/740,075, of the same title, and filed on Jan. 11, 2013; and U.S. patent application Ser. No. 13/753,458, of the same title, and filed on Jan. 29, 2013 are herein incorporated by reference in their entirety. Further, U.S. patent application Ser. No. 12/997,251, entitled "Photomultiplier and Detection Systems", filed on Dec. 10, 2010, which is a national stage application of PCT/GB2009/001444, filed on Jun. 11, 2009 and which relies on Great Britain Patent Application Number 0810638.7, filed on Jun. 11, 2008, for priority, all of which are herein incorporated by reference in its entirety.

Nuclei of some elements have a relatively large cross-section which aid in the detection of thermal neutrons. These elements include helium (He), gadolinium (Gd), cadmium (Cd) and two particularly large cross-section nuclei: lithium-6 (Li-6) and boron-10 (B-10). In the case of all of these elements, and energetic ion and a secondary energetic charged particle are produced upon interaction of their large cross-section nucleus with a thermal neutron.

For example, the interaction of a neutron with a B-10 nucleus can be characterized by the following reaction:

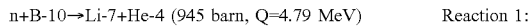

n+B-10→Li-7+He-4 (945 barn, Q=4.79 MeV)     Reaction 1:

Here, the cross section and the Q value, which is the energy released by the reaction, are shown in parentheses.

Similarly, the interaction of a neutron with a Li-6 nucleus is characterized by the following reaction:

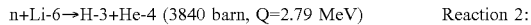

n+Li-6→H-3+He-4 (3840 barn, Q=2.79 MeV)     Reaction 2:

FIG. 1C illustrates a side cross-sectional view of a conventional parallel-plate neutron detector 100 that is tiled to cover a large area. FIG. 1D illustrates a front cross-sectional view of the parallel-plate neutron detector 100 shown in FIG. 1C. As shown in FIG. 1C, in the above configuration of neutron detection system multiple layers of detectors 102 surrounded by a moderator 104, such as polyethylene, are used to achieve high detection efficiency. The disadvantage of such a detection system is the complexity of constructing and assembling a large number of detector units.

In an embodiment, the present specification discloses a novel neutron detection system based on thin gas chamber technology which is much easier to fabricate unlike the parallel plate neutron detector 100 described above.

A thin gap chamber (TGC) is a thin planar, position sensitive detector that can be constructed to cover large areas. A TGC detector comprises a chamber filled with a suitable gas mixture and an array of thin parallel wires whereby the walls of the chamber are internally lined with graphite. The wires form the (virtual) anode plane and the graphite serves as the cathode. Charged particles interact with the gas mixture causing ionization which induces signals in the wires. This signal may be measured using any suitable processing system.

In various embodiments, the processing system may comprise electronics and any computing platform including, but not limited to: a laptop or tablet computer; personal computer; personal data assistant; cell phone; server; embedded processor; main-frame; digital signal processor (DSP) chip or specialized imaging device.

In an embodiment of the present specification, a thin layer of boron carbide (such as $B_4C$ or $B_8C$), which is optionally enriched with B10, is coated on the walls of the chamber of a TGC detector. Boron carbide may be used instead of graphite. The TGC is inserted in a moderating material such as polyethylene. Fast neutrons emitted by a material being inspected slow down in the moderator and are captured in the boron layer with subsequent emission of lithium-7 ($^7$Li) and alpha particles. In such a reaction, one or more of the emitted particles exits the boron layer, enters the gas present in the thin chamber and produces ionization of the gas, which, in turn, is converted into a measurable electric signal indicative of the incident neutron.

FIG. 2 illustrates a cross-sectional view of a TGC detector component. As shown in FIG. 2, the TGC detector 200 comprises: an anode (virtual) plane defined by a set of thin wires 202 approximately 50 micron in thickness and connected to a high voltage of approximately 3 kV; two graphite layers 204, that serve as the cathode and are respectively positioned above the wires 202 on the top side and below the wires 202 on the bottom portion of the detector 200; printed (etched) high-resolution strips or pads 206 (approximately having a pitch of 2-3 mm) that sample the charge distribution induced on the wires/anode 202 and are respectively positioned above the graphite layer 204 on the top side and below the graphite layer 204 on the bottom portion of the detector; shielding plates 208 on both the top outer surface and the bottom outer surface of the detector 200; and, a gaseous mixture 210 of n-pentane and $CO_2$ for filling the space within the TGC detector 200. A G10 substrate 209 is used between the graphite cathode planes 204 and shielding plates 208 on both the top and bottom portions of the detector 200.

Traversing charge particles create positive ions which are attracted by a weak electrical field created near the cathode 204 and negative ions which are strongly attracted by a high electrical field created near the wires/anode 202. The negative ions acquire increasing energy as they get closer to the wires/anode 202, creating an avalanche of ions, thereby yielding a measurable signal. In an embodiment, data acquisition hardware based on high-speed analog design that generates short pulses for the x-y location of the TGC detector along the gratings of each detector is used.

FIG. 3 illustrates a TGC-based neutron detector in accordance with an embodiment of the present specification. The TGC detector 300 comprises: an anode (virtual) plane defined by a set of thin wires 302 which in an embodiment are connected to a high voltage; two cathode planes 304 respectively positioned above and below the wires 302, printed or etched high-resolution strips or pads 306 that sample the charge distribution induced on the wires/anode 302; shielding plates 308 positioned in a stacked manner relative to the cathode planes 304 and the strips or pads 306; a moderator, such as polyethylene 310 placed on either sides of the shielding plates 308; and a gaseous mixture 312 within the space defined by the upper and lower cathode planes 304 which, in an embodiment, comprises n-pentane and $CO_2$ for filling the space within the TGC detector. The cathode plates 304 comprise a thin layer (~1 μm) of boron carbide which in an embodiment is in the form of $^{10}B_4C$ or $^{10}B_8C$.

In an embodiment, fast neutrons incident on the detector 300 slow down in the moderator material 310 and are captured by the B10 in the boron carbide cathode 304, resulting in emission of $^7$Li and alpha particles. One of the emitted particles exits the boron carbide cathode 304 layer and enters the gaseous mixture 312, resulting in the ionization of the gaseous mixture 312, which in turn produces a measurable signal. The signal is a measurable current pulse which can be measured at the output of the detector 300 by using any standard method used for measuring TGC detector output.

FIG. 4A illustrates a side cross-sectional view of a plurality of thin gap chambers embedded in a moderator, in accordance with an embodiment of the present specification. In an embodiment, the detection system 400 comprises multiple layers of thin gap chamber detectors (TGC) 402a, 402b, 402n–1 and 402n embedded within a moderator such as polyethylene 404. The actual number of TGC deployed in the detection system will depend on the extent of coverage and detection efficiency required for specific application. In an embodiment, the moderator thickness 'd' 406 between any two adjacent thin gap chamber detectors 402a, 402b, 402n–1 and 402n is approximately 1 cm. It should be noted herein that this thickness is not limiting and that the thickness between any two thin gap chamber detectors may range from 0.1 cm up to on the order of 5 cm, depending upon the response time and detection efficiency required for the application. The thicknesses provided herein are only exemplary and not to be construed as limiting. The use of multiple TGC detectors 402a, 402b, . . . , 402n–1 and 402n enhances the detection efficiency, as more neutrons interact in the polyethylene 404 and can be captured in the additional boron carbide layers within the TGC detectors 402a, 402b, . . . , 402n–1 and 402n. A layer of polyethylene 404 with a thickness 'f' 408 of approximately 2 cm is placed in the front of the stack, i.e. in front of TGC detector 402a, and a thicker layer of polyethylene 404 with a thickness 'b' 410 of approximately 5 cm is placed behind the stack, i.e. behind TGC detector 402n, in order to reflect some of the neutrons that have traversed the stack. In an embodiment, the detector illustrated in FIG. 4A is suitable for highly-efficient passive radiation measurements. The length 'l' 411 and height 'h' 412 of the neutron detection system is selected depending on the extent of area to be covered and the application for which the detection system is developed.

FIG. 4B illustrates a front cross-sectional view of the neutron detector shown in FIG. 4A. FIG. 4B illustrates the width of the detector 'w' 413, the polyethylene coverage 'S1' on one side portion and 'S2' on the top portion and the electronics 416, as shown in FIG. 4A. The width of detector 'w' depends on the required detection area which in turn would depend on the actual application.

FIG. 5 illustrates an embodiment of the electrical connections of the TGC detector shown in FIG. 4A. As shown in FIG. 5, the anode wires 502 sandwiched between the pads 504 and boron carbide cathode 506 are connected to a high voltage 508 of approximately 3 kV, whereas the cathode boron carbide layers 506 are connected to ground 510. In an embodiment, pads 504 are employed for spatial resolution. The pads and the signals from the wires are employed to obtain two dimensional spatial information of where particles, such as muons, interact with the detector. In most cases, when detecting neutrons, there is no need to measure the position of the neutron interaction, but rather to simply determine the presence of neutron radiation. Additional electronics to obtain spatial resolution would confound the system and increase the cost to read a signal where information from that signal is not needed. In an embodiment for detection of neutrons, the pads are not employed as there is no requirement for spatial information and group of wires are connected together to read the signals.

FIG. 6 illustrates a stack of TGC detectors designed for providing a fast response time in accordance with an embodiment of the present invention. The stack 600 is suitable for active interrogation where the TGCs 602 embedded in the moderator 604 are separated by a distance 'd$_2$' 606 which is smaller than the distance 'd' 406 of approximately 0.5 cm in the detector illustrated in FIG. 4A used for passive measurements. In an embodiment, the moderator material 604 is polyethylene. A layer of polyethylene 604 with a thickness 'f2' 608 of approximately 2 cm is placed in the front of the stack. Further, a layer of polyethylene 604 with a thickness 'b2' 610 which is approximately 2 cm is placed behind the stack. In this embodiment, the thickness 'b2' 610 is smaller than the moderator thickness 'b' 408 placed behind the stack in the detector illustrated in FIG. 4A. Further, to obtain similar detection efficiency, the number of thin gap chambers 602 is greater than the number of TGC detectors 402 used in the detector of FIG. 4A. The higher number of TGC detectors 602 enables obtaining similar detector efficiency while getting a faster response time. Generally, increasing the number of TGC detectors increases the efficiency for passive and active measurements. Most active measurements (used for the detection of SNM) require fast response times, for example, <20 μs or shorter is preferred. As discussed above, the neutrons slowdown in the polyethylene layers. Large sections of polyethylene between the TGCs results in potentially longer path lengths for the neutrons before they are captured in the boron. Longer path lengths result in longer fly times and thus, slow down the response time of the detector. Thus, thinner polyethylene layers such as those used in the above embodiment result in faster response time.

FIG. 7 illustrates a dual detection system comprising TGC based neutron detector and a gamma detector in accordance with an embodiment of the present specification. The detection system 700 comprises a plurality of TGC detectors 702 such as those illustrated in FIG. 3, embedded in a moderator such as polyethylene 704. In an embodiment, a plastic scintillator 706 is placed in a front of the stack of TGC detectors 702 in order to measure gamma rays. In an embodiment, the plastic scintillator 706 is comprised of polyvinyl toluene (PVT). In an embodiment, the plastic scintillator 706 also serves as the front moderator. The detection system 700 may be used for both the measurement of gamma rays as well as neutrons. One of ordinary skill in the art would appreciate that the configuration and positioning of plastic scintillator 706 can be different than that depicted in FIG. 7 without departing from the spirit and scope of present specification.

Figure 8:
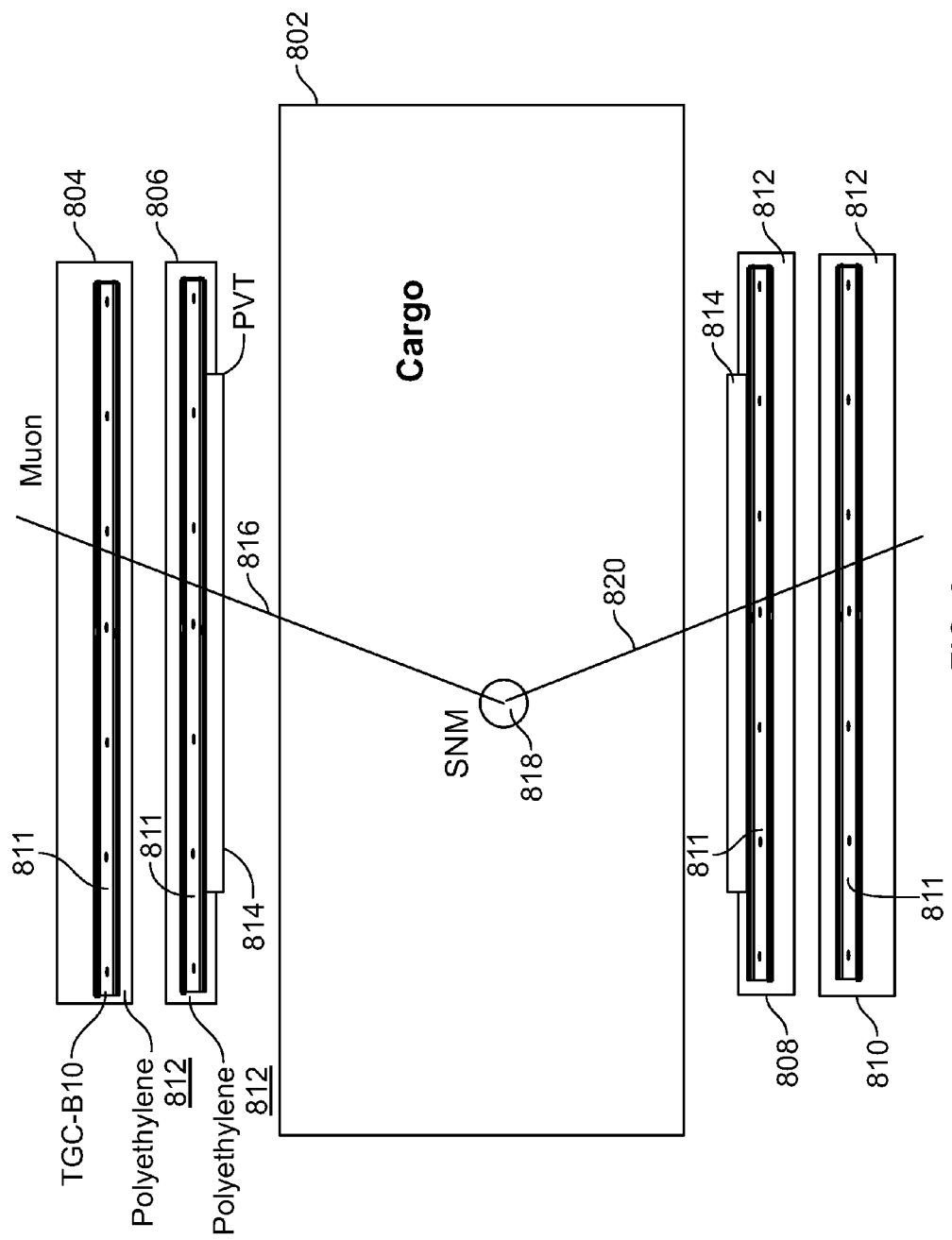

FIG. 8 illustrates an integrated detection system for inspecting cargo through detection of neutrons, gamma rays and muons in accordance with an embodiment of the present specification. In an embodiment, multiple TGCs based detectors as described in FIG. 3 are deployed along with gamma detection mechanism to detect neutrons, muons and gamma rays. The composite detection system comprises a first TGC detector 804, a second TGC detector 806, a third TGC detector 808 and a fourth TGC detector 810. In an embodiment, the thin gap chambers 811 employed in detectors 804, 806, 808 and 810 comprise a cathode developed from a boron carbide material as described in the embodiment shown in FIG. 3. In an embodiment, the TGC detectors 804 and 806 are positioned above the cargo 802, as shown, and the TGC detectors 808 and 810 are positioned below the cargo 802. In an embodiment, the TGC detectors 804, 806, 808 and 810 comprise a moderator such as polythene 812 surrounding the thin gap chambers 811 of the detectors 804, 806, 808 and 810. Further, in an embodiment, the sides of the TGC detectors 806 and 810 facing the cargo 802 comprise a layer of one or more plastic scintillators 814. In an embodiment, the plastic scintillators 814 are comprised of polyvinyl toluene (PVT) coupled to one or more PMTs (Photo Multiplier Tubes). Plastic scintillators 814 span part of the area of the detectors 806 and 808, with the rest covered by polyethylene 812. The presence of moderator 812 and plastic scintillator 814 can scatter the muons. However, this effect is compensated by design of detection system described in present specification.

In an embodiment, the distance between the TGC detectors 804 and 806 is approximately 0.4 m, in order to enable the detectors 804, 806 to detect the direction or angle of incidence of the incident muons 816. The TGC detectors 808 and 810 are placed below the cargo 802 in order to detect the muon scattering angle or the angle of exit of the scattered muons 820. In an embodiment, the width and length of the TGC detectors ranges from approximately 3 m×3 m (total area 9 m$^2$) to 4 m×4 m (total area 16 m$^2$) so as to enable capturing incident and scattered muons at large angles. The muons are detected by ionization occurring in the gaseous mixture within a TGC detector. In an embodiment, the direction of the incident muons 816 is determined by their interaction points within the top TGC detectors 804, 806, and the scattering angle (which is indicative of the atomic number of the SNM material 818) is measured by the point of interaction of the muons 820 in the lower TGC detectors 808, 810 in coincidence with all the TGC detectors.

In an embodiment, neutrons are distinguished from muon interactions by non-coincident interactions in the TGC detectors 804, 806, 808 and 810. Muons are very penetrating and travel through the two top/bottom detectors, while the Li7 and alpha particles are stopped in one detector. Therefore, it is understood that if one of the TGC detectors measures a signal, then it is due to a neutron interaction and if two or more detectors measure a signal, then it is due to a muon interaction (except for some cases when the interaction occurs at the edges of the detector and the event is rejected). In an embodiment, the gamma rays are measured by using the plastic scintillators 814. Most radiation portal monitors (RPM) deployed around the world employ plastic scintillators to detect gamma rays and moderated He-3 detectors to measure neutrons. It is important to note that in typical RPMs, only one or two He-3 tubes are used per module with a suboptimal moderating configuration to reduce cost. This results in a low neutron detection efficiency. The proposed neutron detectors of the present specification comprising modified TGCs with boron carbide cathode can replace He-3 detectors in current RPMs. Further, the detectors of present specification do not contain hazardous materials and hence do not require special transport permits. In addition, these detectors are composed of commercially available construction materials and are rugged in construction both mechanically as well as environmentally. Also, the TGC detectors of the present specification are easy to manufacture in large areas for greater efficiency at a reasonable cost. Further, the detectors can be designed for fast-time response for active interrogation applications at lower cost than other available solutions. Yet further, the TGC detectors of the present specification can be used for simultaneous detection of neutron, gamma-ray and muon radiation for passive cargo inspection.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for simultaneous detection of scattered muons, to detect a presence of high-Z materials, and neutrons emitted from radioactive materials concealed in a cargo comprising:
   at least two thin gap chambers placed above the cargo and at least two thin gap chambers placed below the cargo wherein each of said thin gap chambers contains a gaseous substance and comprises an array of wires that is configured to be an anode and at least one layer of thermal neutron absorber material is configured to be a cathode;
   a moderator material positioned proximate each thin gap chamber to decrease a speed of incoming fast neutrons; and
   a controller to detect and process signals, generated in said array of wires, representative of neutron and muon radiation intensity.

2. The system according to claim 1, where a gamma ray detector is positioned facing the cargo such that gamma rays can be simultaneously detected along with neutrons and muons.

3. The system according to claim 1, wherein said thermal neutron absorber material comprises at least one of boron carbide such as in form of $^{10}B_4C$ or $^{10}B_8C$, or $^6Li$.

4. The system according to claim 1, wherein, for muon detection, the two thin gap chambers above the cargo detect a first coordinate and an angle of incidence of incoming muons and the two thin gap chambers below the cargo detect a second coordinate and an angle of exit of the muons.

5. The system according to claim 1, wherein muon particles are detected based on recording of signals in two or more thin gap chambers and neutrons are detected based on recording of signals in only one thin gap chamber.

6. A system for simultaneous detection of scattered muons, a presence of high-Z materials, gamma rays and neutrons emitted from radioactive materials concealed in a cargo comprising:
   at least two thin gap chambers placed above the cargo and at least two thin gap chambers placed below the cargo wherein each of said thin gap chambers is filled with a gaseous substance and comprises an array of wires that function as an anode and at least one layer of thermal neutron absorber material that functions as a cathode;
   a moderator material positioned near each thin gap chamber to slow down the incoming fast neutrons;
   a gamma-ray detector placed facing the cargo; and
   a controller to detect signals representative of neutron, gamma and muon radiation strength.

* * * * *